Jan. 20, 1925.                                                       1,523,558
E. F. PAWSAT
RETAINING CLIP FOR BICYCLE STANDS
Filed Jan. 22, 1923

Ewald F. Pawsat
INVENTOR.

BY Erwin, Wheeler & Woolard
ATTORNEYS.

Patented Jan. 20, 1925.

1,523,558

UNITED STATES PATENT OFFICE.

EWALD F. PAWSAT, OF SHEBOYGAN, WISCONSIN.

RETAINING CLIP FOR BICYCLE STANDS.

Application filed January 22, 1923. Serial No. 614,180.

*To all whom it may concern:*

Be it known that I, EWALD F. PAWSAT, a citizen of the United States, residing at Sheboygan, county of Sheboygan, and State of Wisconsin, have invented new and useful Improvements in Retaining Clips for Bicycle Stands, of which the following is a specification.

This invention relates to improvements in retaining clips for bicycle stands. More particularly this invention relates to improved means for securing such clips to the rear mud guards of bicycles, motorcycles and the like.

Well equipped bicycles are frequently provided with U-shaped stands, the legs of the stand being usually pivoted to oscillate about the rear axle of the bicycle as an axis. In one position the stand is adapted to contact with the ground directly beneath the rear wheel of the bicycle. In this position the substantial width of the stand serves to support the bicycle in an upright position. When it is desired to use the bicycle the stand is oscillated rearwardly and upwardly about its pivot on the rear axle of the machine and comes into contact with a resiliently yieldable clip supported from the rear mud guard. This clip is adapted to retain the stand in an out-of-the-way position at such times as the stand is inoperative.

It so happens that most bicycles are provided with mud guards, whereas only the more completely equipped bicycles are provided with stands of the sort above described. It is desirable also to provide for the attachment to any bicycle of a supporting stand whether or not the bicycle was originally so equipped. Accordingly, manufacturers of mud guards usually provide apertures adjacent the rear extremity of mud guards for the rear wheel of a bicycle in order that such apertures may be used to receive bolts or rivets for the purpose of fastening a stand retaining clip to the mud guard.

The clips have heretofore also been provided with a pair of spaced apertures intended to register with the aperture of the mud guard. Thus a manufacturer of bicycles, having been supplied independently with mud guards and clips, will assemble the clips and mud guards together for such bicycles as are to be provided with stands and will use the mud guards alone for such machines as are not to be provided with stands. If at any time a customer desires to provide his machine with a stand subsequent to the time of its purchase, he can procure with the stand a clip provided with apertures intended to register with those in the mud guard of his cycle.

The difficulty has heretofore been experienced that the apertures provided in the clip and in the mud guard have not registered accurately. Frequently such apertures have failed to register at all and the drilling of new apertures has been required preliminary to the installation of a stand retaining clip. It is the primary object of this invention, therefore, to provide a stand retaining clip with means by which the clip can be secured to any apertured mud guard without any necessity for accurate or expensive work in the provision of the apertures in either the clip or the mud guard. This feature makes it possible for a bicycle manufacturer to procure, if he so desires, his clips from one concern and his mud guards from another, since the particular spacing of the apertures in either the mud guard or clip will be unimportant in the practice of this invention.

Further objects of this invention are to provide securing means for a clip, whereby it may be secured without an accurate alignment of apertures and will, nevertheless, be so positioned that it will not tend to work loose or to rattle; and to provide flexible securing means between a clip and a mud guard without rendering the assembled structure unsightly.

In the drawings:—

Like parts are identified by the same reference characters throughout the several views.

Figure 1:
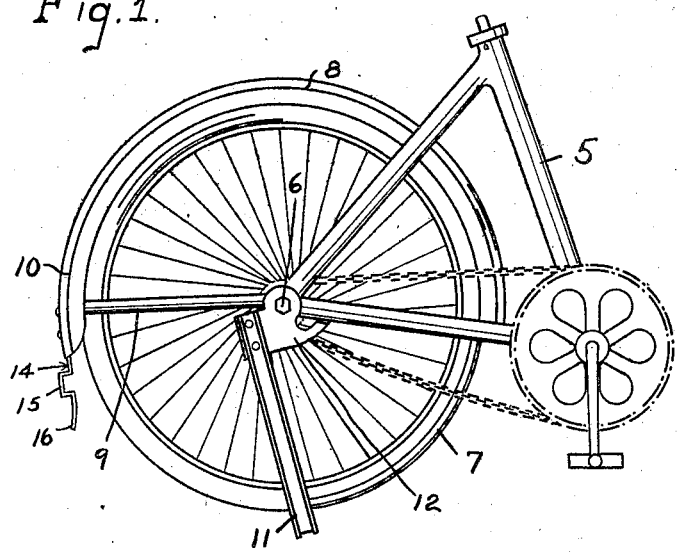
Fig. 1 is a side elevation of the rear portions of a bicycle, showing the general relation of the support and clip to the mud guard and to the parts of the bicycle.
Figure 2:
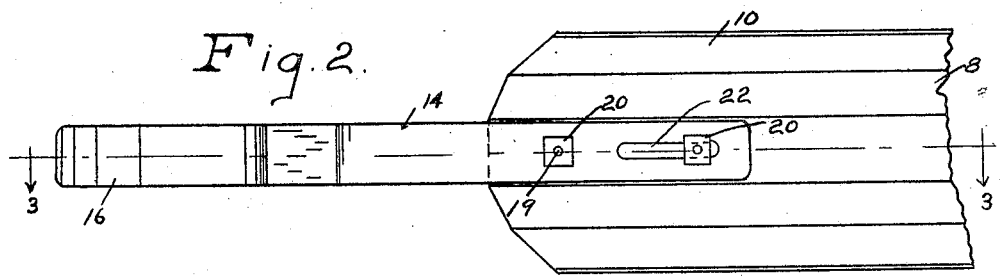
Fig. 2 is a plan view of an inverted section of the mud guard showing a stand retaining clip secured thereto by the improved means which forms the subject matter of this invention.
Figure 3:
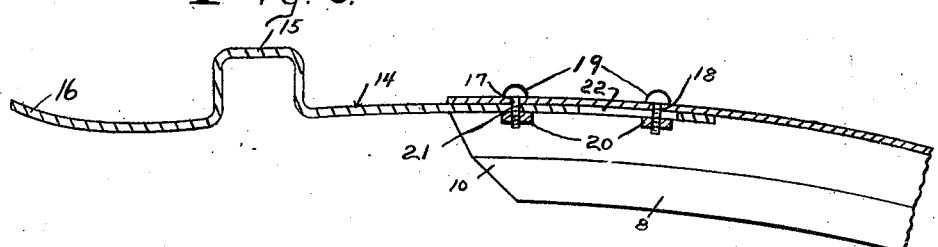
Fig. 3 is a section taken on line 3—3 of Fig. 2.

The bicycle frame 5 converges rearwardly to the rear axle 6 upon which the rear wheel 7 is rotatably mounted. The wheel is encircled by a substantially concentric mud guard 8 supported from the frame in the usual manner and provided with a brace 9 by means of which its rear extremity 10 is positioned from the rear axle 6.

The support 11 for the machine preferably comprises the usual U-shaped stand and may be provided with ears 12 apertured to receive the rear axle 6, whereby the stand is supported for oscillation about said axle. The stand is shown in Fig. 1 to be in its operative position, wherein the rear parts of the bicycle are supported above the ground, and the stand, by its substantial width, provides a relatively stable foundation from which the bicycle is supported. This invention, however, does not relate to the supporting device but to the clip for maintaining this device in its inoperative position.

The clip is designated, in its entirety, by the reference character 14. It comprises a strip of resiliently yieldable metal which is secured to the rear extremity 10 of the mud guard 8 and projects downwardly therefrom. The metal comprising clip 14 is bent to provide at 15 a notch or recess of sufficient size to receive a portion of the stand 11 when the stand is swung upwardly. Below the bent portion 15 the clip is rearwardly curved as at 16 to provide a cam surface, whereby the support 11, during its upward movement, may act upon said clip to press it rearwardly. As the upwardly moving stand 11 registers with the recess 15, the resiliency of the clip urges the clip forwardly into engagement with the stand 11 and the stand will thereby be supported until manually released by springing the clip outwardly to a position such that the stand may drop from engagement with the recess. The construction of a clip of this character is well understood in the art and forms no part of the present invention, except as specified hereinafter.

The portion 10 of the mud guard is centrally apertured at 17 and 18 to receive suitable securing rivets or bolts 19. Bolts are shown in the accompanying drawings and are provided with nuts 20. As has been indicated above, it has previously been the practice to attempt to form holes in the clip 14 which would register with apertures 17 and 18 in the mud guard. It has, however, been expensive to provide for the necessary accuracy of alignment and at best the alignment of the apertures in these members has been faulty. The present invention contemplates the provision of a single round aperture 21 in the clip 14. This aperture is preferably substantially the diameter of bolt 19 in order that the clip may not be permitted any freedom of movement with respect to the mud guard. It will readily be appreciated that the operation of the clip, when the support is moved upwardly toward its inoperative position, depends in large part upon the fact that the clip is maintained stationary. If it were posible for the clip to slide upwardly,—for example, should one of the nuts 20 become loosened,—the result would be that the resiliency of the clip would be impaired and it might become wholly inoperative. It is preferred, therefore, that the aperture 21 be so made as to fit bolt 19 rather closely. Thus when the apertures 17 and 21 are brought into registry and the bolt 19 is passed through them and threaded into nut 20 the position of the clip 14 is defined with respect to the mud guard and it cannot move from this position unless the nut 20 shall become so loosened as to fall off.

In order to prevent any possible pivotal movement of the clip 14 about bolt 19 in the aperture 17, a second bolt 19 is passed through the aperture 18 in the mud guard. Whereas, however, the clip 14 has heretofore been bored or punched to provide a circular aperture to receive this second bolt, the present invention contemplates the provision of an elongated slot 22 in the clip through which the second bolt may pass. A nut 20 tightened upon this second bolt maintains it in position, whereby it operatively serves to prevent any possibility of rotation of the clip as aforesaid. At the same time the necessity for any accurate alignment of holes 17 and 18 with respect to corresponding apertures on the clip is obviated, since within the capacity of slot 22, a wide range of variation in position of aperture 18 is possible. Thus one of the bolts 19 cooperates with an aperture which fits closely to the bolt thereby securing the clip against longitudinal movement while the second bolt 19 is engaged in a slot, the sides of which fit closely to the bolt upon opposite sides thereof and prevent the possibility of any oscillation of the clip about the first bolt as a center. Thereby the clip is secured against any possibility of movement with respect to the guard 8 and at the same time the objections herein noted with respect to the difficulty heretofore encountered in alignment have been entirely overcome.

I recognize that equivalent results so far as alignment is concerned might be obtained by slotting the mud guard instead of the clip, but the present construction is preferred since the slot is a comparatively unsightly feature and, by the present construction, the slot is concealed within the mud guard.

I claim:

1. A stand supporting clip adapted to be secured to a cycle mud guard and comprising a strip of resiliently yieldable material provided adjacent one end with an aperture adapted to receive a securing bolt with a close fit, and with a slot spaced from said aperture and extending longitudinally of said strip.

2. The combination with a cycle mud guard provided with longitudinally spaced apertures adjacent its extremity, of a stand supporting clip provided with longitudinally spaced apertures and securing means each adapted to be inserted through an aperture of said guard and an aperture of said clip, one of the aforesaid apertures being elongated longitudinally, whereby the necessity for accurate alignment of the remaining apertures is obviated.

3. The combination with a mud guard provided with longitudinally spaced apertures adjacent an extremity, of a stand supporting clip comprising a resiliently yieldable strip of metal provided adjacent its upper extremity with longitudinally spaced apertures adapted to receive securing means passing through the apertures of the guard, one of the aforesaid apertures being elongated, and securing means connecting said guard and clip through said apertures.

4. The combination with a mud guard provided with longitudinally spaced apertures adjacent an extremity, of a stand supporting clip comprising a strip of resiliently yieldable metal provided adjacent an extremity with longitudinally elongated slot and a circular aperture spaced therefrom, said slot and aperture being adapted to receive bolts projecting inwardly from the apertures of the guard, and bolts extending through said guard and provided at their inner ends with nuts adapted to secure said strip and guard together.

EWALD F. PAWSAT.